United States Patent
Schilling et al.

(10) Patent No.: US 7,248,641 B2
(45) Date of Patent: *Jul. 24, 2007

(54) DEVICE FOR TRANSMITTING DIGITAL SIGNALS AMONG MOBILE UNITS

(75) Inventors: Harry Schilling, Eichstätt (DE); Nils Krumme, Feldafing (DE); Georg Lohr, Eichenau (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 730 days.

This patent is subject to a terminal disclaimer.

(21) Appl. No.: 10/674,881

(22) Filed: Sep. 29, 2003

(65) Prior Publication Data

US 2004/0121737 A1 Jun. 24, 2004

(30) Foreign Application Priority Data

Sep. 27, 2002 (DE) ............... 102 45 589

(51) Int. Cl.
*H04L 27/04* (2006.01)
*H03K 5/159* (2006.01)

(52) U.S. Cl. ...................... 375/295; 375/232

(58) Field of Classification Search ........... 375/295, 375/232, 341, 346; 709/232; 455/78
See application file for complete search history.

(56) References Cited

U.S. PATENT DOCUMENTS

| | | | | |
|---|---|---|---|---|
| 5,007,085 A | * | 4/1991 | Greanias et al. | 726/34 |
| 5,745,082 A | * | 4/1998 | Alder | 343/753 |
| 6,433,631 B2 | | 8/2002 | Pearson, Jr. et al. | |
| 6,470,047 B1 | * | 10/2002 | Kleinerman et al. | 375/232 |
| 6,980,539 B2 | * | 12/2005 | Hanada et al. | 370/342 |

FOREIGN PATENT DOCUMENTS

| | | |
|---|---|---|
| DE | 4412958 | 10/1995 |
| DE | 19700110 | 7/1998 |

* cited by examiner

*Primary Examiner*—Khai Tran
(74) *Attorney, Agent, or Firm*—Kevin L. Daffer; Daffer McDaniel, LLP

(57) ABSTRACT

A device for the transmission of digital signals between two units mobile relative to each other, in particular via non-contacting rotary joints, comprises a coding means on a transmitter side along a signal transmission path for matching a coding of the digital signals to transmission characteristics of the signal transmission path, so that an optimum transmission is achieved. An optional decoder means on a receiver side regenerates original signals so that the coding remains hidden, but a substantially more reliable transmission is achieved.

17 Claims, 1 Drawing Sheet

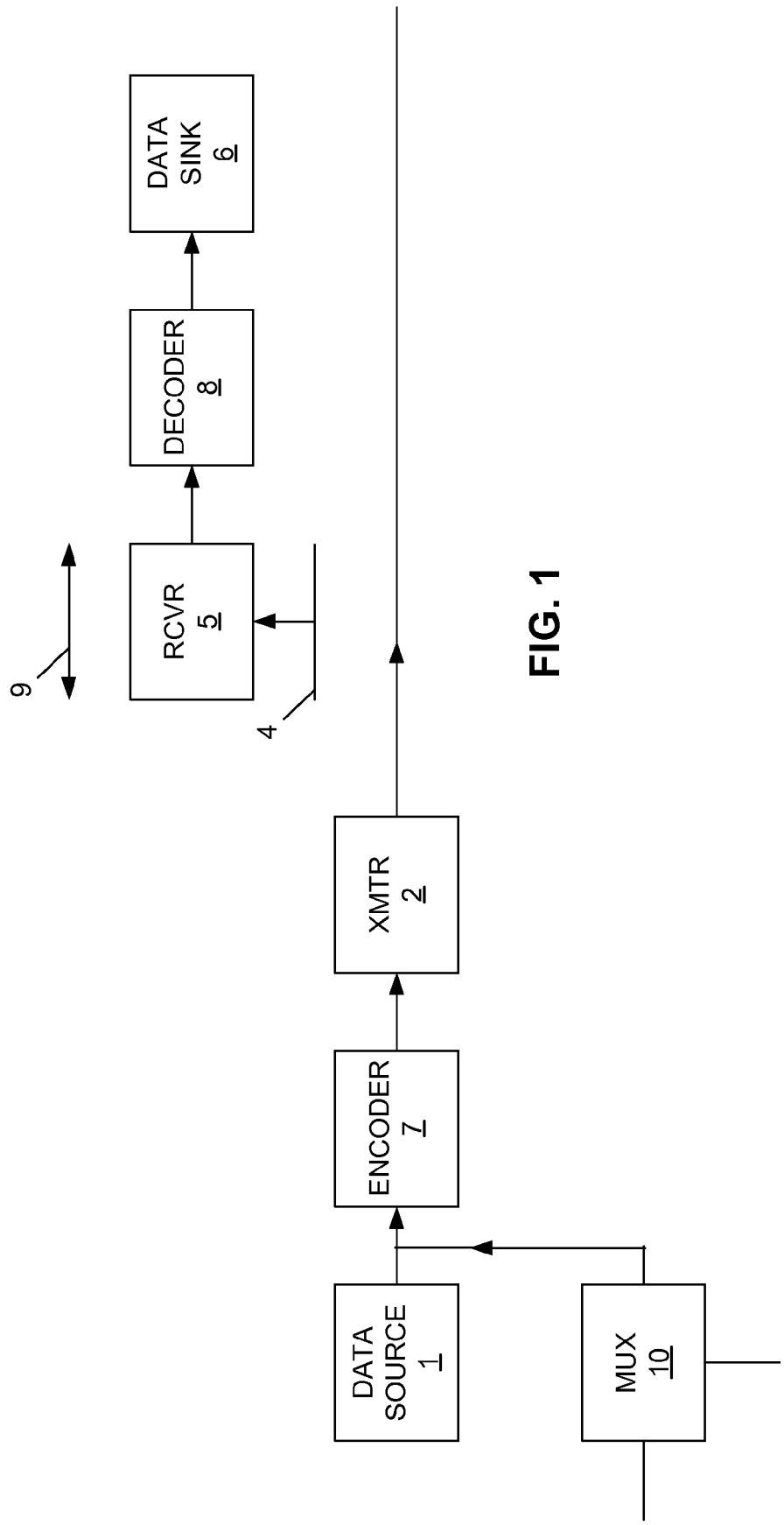

DEVICE FOR TRANSMITTING DIGITAL SIGNALS AMONG MOBILE UNITS

FIELD OF THE INVENTION

The present invention relates to a device for transmitting digital signals among a plurality of units mobile relative to each other.

For the sake of clarity, in the present document, the transmission between units mobile relative to each other, on the one hand, is not distinguished from the transmission between a stationary unit and units mobile relative to the first unit, on the other hand, because this is only a question of local relationship and does not take any influence on the mode of operation of the invention. Equally, a distinction is not made between the transmission of signals and energy because the mechanisms of operation are the same in this respect.

PRIOR ART

In units mobile along a linear path, such as crane and conveyor installations, as well as in rotary units such as radar systems and also computer tomographs, it is necessary to transmit electrical signals or energy, respectively, between units mobile relative to each other. To this end, mostly a conductor array is provided in the first unit and corresponding tapping means are provided in the second unit. The term "conductor arrays" as used in the description given below refers to any forms whatsoever of conductor arrays conceivable, which are suitable for conducting electrical signals. This refers also to the known contacting sliding paths or sliding rings, respectively.

A suitable device is described in the laid-open German Patent Application DE 44 12 958 A1. There, the signal to be transmitted is supplied into a strip conductor of the first unit that is arranged along the path of the movement of the units mobile relative to each other. The signal is tapped by the second unit by means of capacitive or inductive coupling.

The coupling factor of the signal between the two units is substantially a function of the distance of the two units from each other. Particularly in transmission systems with three-dimensional extension and especially in the event of high speeds of movement, the distances between the mobile units cannot be determined with an optional precision, which is due to the mechanical tolerances. As the position of the two units relative to each other and the speed (e.g. caused by vibrations) and other influential parameters vary, the coupling factor frequently varies therefore, too. At the same time, the signal amplitude at the receiver input varies as well. This results in variations in the signal in receivers presenting the conventional design, which are noticeable, for instance, in the form of an increased jittering or even bit errors. Moreover, variations of the noise immunity occur likewise as a result.

The device disclosed in the German Patent DE 197 00 110 A1 leads to an improvement of the transmission characteristics, which device presents a conductor array with filter features instead of a strip line. On principle, however, the problems remain as they are.

The U.S. Pat. No. 6,433,631 B2 discloses a device for feedback control of the input level at the receiver. To this end, the signal amplitude is measured downstream of a pre-amplifier whilst an attenuator element is controlled in correspondence with this signal amplitude, which is provided ahead of the pre-amplifier. The disadvantage of this system resides in the aspect that it can exclusively make a signal available to the receiver, which presents a constant amplitude.

The disadvantage of the devices according to prior art resides in a still insufficient noise immunity. Even though the levels of the transmitted signal can be increased on the line in order to improve the noise immunity the undesirable radiation of high-frequency signals increases as well. As a matter of fact, a reduction of the level of the transmitted signal reduces the radiation but the immunity to stray-in interference from the outside is reduced as well.

BRIEF DESCRIPTIONS OF THE INVENTION

The present invention is based on the problem of designing a device for the transmission of electrical signals, which avoids the aforementioned disadvantages and presents in particular a high noise immunity and hence a high quality of signal transmission.

In accordance with the present invention, this problem is solved with the means defined in the independent Claims. Expedient improvements of the invention are the subject matters of the dependent claims.

An inventive device serves to transmit digital signals between at least two units mobile relative to each other. It is, of course, possible to arrange one or more units on each side of the movement. For a simplified representation, here reference is made exclusively to a second unit that is mobile relative to a first unit.

A data source (1) for generating a serial data stream such as a parallel-to-serial converter according to prior art is associated with the first unit. Moreover, a transmitter (2) is provided that generates electrical signals from the serial data stream of the data source for the transmission via a transmitter conductor array (3). A receiving antenna (4) for tapping electrical signals in the near field of the transmitter conductor array is associated with the second unit. The electrical signals of the receiving antenna are supplied via a receiver (5) to a data sink (6) for subsequent processing of the signals.

In accordance with the invention, now a coding means (7) is provided between the data source (1) and the transmitter (2). This coding means is so designed that it converts the digital coding of the data stream in such a manner that the data with minimum errors can be transmitted via the transmitter (2), the transmitter conductor array (3), the receiving antenna (4) as well as the receiver (5).

In correspondence with the essence of the invention, the coding means is provided in the transmission path for the electrical signals between the data source (1) and the transmitter (2). It is, of course, also possible to provide this coding means in the transmitter (2).

The essential feature of the coding means is its adaptation of the coding of an optional digital signal to the transmission characteristics of the respective path of electrical data transmission between the transmitter and the receiver.

With an inventive device, a quality of signal transmission can be achieved which is substantially better than the quality of prior art.

In a particularly expedient embodiment of the invention, a decoder means (8) is associated with the second unit, between the receiver (5) and the data sink (6), for decoding the signals encoded by the coding means (7). With this decoder means, the coding provided by the coding means is cancelled so that the signals supplied to the data sink correspond to the data stream from the data source (1). It is, of course, possible to dispose the decoder means also in the receiver (5). In this manner, the coding is completely transparent to the data source or the data sink, respectively, for an optimum transmission of the data along the data transmission path.

According to a further expedient embodiment of the invention, the coding of the data stream by means of the coding means (7) entails a conversion of the spectral characteristics of the data stream. For instance, coding is carried out in such a way that the signal power can be optionally increased or reduced within predetermined spectral ranges. Due to an adaptation of the spectral characteristics of the signal it is possible to adapt the quality of transmission to the frequency response of the remaining parts of the transmission path as well as to existing sources of interference or noise-sensitive components.

When the data transmission path presents a particularly strong attenuation between the transmitter and the receiver, for example within one or several known frequency ranges, it is now expediently possible to design the coding in such a way that this frequency range will not be used for transmission. In the opposite case, with frequency ranges of particularly low attenuation, it is possible to place a maximum in these frequency ranges by suitable coding.

When external sources of interference are provided that impair the transmission of the signals the coding process is expediently carried out in such a way that these frequency ranges are optionally excepted. As an alternative, it is equally possible with an appropriate coding to emit a particularly high amplitude within these frequency ranges.

When components with particularly high sensitivity to noise are present outside the data transmission path it is possible to adapt the spectrum of the transmitted signal by such a coding in a way that only low signal levels are emitted in the highly noise-sensitive frequency ranges. On principle, here, too, the known line spectrum of digital signals can be widened by appropriate coding in order to comply with the threshold values measured in compliance with the current EMC standards.

Coding is expediently carried out in such a way that the transmitted signal is free of direct current.

According to another embodiment of the invention, the type of coding can be dynamically adjusted so that the coding can expediently adapt itself to changes created by the movement. To this end, a controller is provided advantageously with means for detecting the actual operating state and for a corresponding setting of the coding for the coding means.

In another embodiment of the invention, the coding means is so designed that it introduces additional redundancy into the data stream. This additional redundancy permits further-going corrections of the information carried in the data stream in the case of transmission errors. These corrections can now be made optionally by the data sink, preferably, however, by a decoder means.

Another embodiment of the invention provides for a design of the coding means in such a form that it replaces information at known positions in the data stream. For example, the coding mechanisms of the majority of data sources are known. With an evaluation at least within the scope of individual data packages, the essential information can now be recognized in the data stream. Irrelevant information can be employed for the transmission of additional redundancy. It is equally possible to combine several data packages or to change the package structure in order to increase the redundancy as well as the noise immunity of the transmitted information. For example, data packages with 4B/5B coding can be converted into a data packages with 8B/10B coding.

According to another embodiment of the invention, the coding means is so designed that it increases the data rate of the serial data stream and creates hence space for additional redundant information. Such a conversion of the data rate or optionally also an aforedescribed conversion of the coding or the package information, respectively, is expediently carried out by converting the serial data stream from the data sources into parallel data words that can be easily modified, with a subsequent conversion into a modified serial data stream for transmission.

Another embodiment of the invention comprises a coding means with at least one multiplexer 10 for the incorporation of further signals or data streams, respectively, into the serial data stream generated by the data source (1). In addition to the principal data stream, frequently additional information, mostly control signals, must be transmitted as well. This information can be expediently incorporated into the data stream as well by means of a multiplexer in the coding means.

Another inventive device comprises a coding means that encodes or ciphers the signals to be transmitted in order to increase the security. In correspondence with the security requirements, a shorter or longer code may be used to this end. In correspondence with the means for decoding it is optionally possible to provide coding means in the data sink or in the decoding means.

According to another expedient embodiment of the invention, the coding means comprises additional storing means as well as means for adapting the data rate of the serial data stream to be transmitted. It is hence possible to adapt the data rate in correspondence with the actual transmission characteristics of the transmission path between the transmitter and the receiver. Specifically in the case of units mobile relative to each other, the actual data rate to be transmitted frequently varies in the course of time or as a function of the position. Examples of influential parameters are the distance between the two units mobile relative to each other, the coupling between these units or even external interfering influences. The coding means serves to adapt the data rate continuously. When, for example, at a certain point of time or at a defined position, the transmission is possible only at a comparatively low data rate the data from the data sources is buffered in the storing means. When, with the lapse of time or with a change of the position, the data rate along the data transmission path is increased again the buffered information may be transmitted. The decoder means is designed in correspondence therewith, which equally comprises means for storing data in the case of a high data rate from the coding means and is hence able to ensure a continuous data stream to the data sink. Optional means are provided for optimum control in order to detect the transmission characteristics.

According to a further expedient embodiment of the invention, the coding means comprises additional means for storing the data. Apart therefrom, an additional communication channel is provided between the decoder means and the coding means for having faulty data signaled by the decoder means to the coding means. When the decoder means establishes that data has been incorrectly transmitted this fact is signaled to the coding means that responds with a repetition of the transmission of the data. Such mechanisms are fundamentally known at higher levels in signal transmission. In these case, there is hence a communication between a first computer, which is connected to the data sources, and a second computer, which is connected to the data sink. In such an array, the communication and the repetition of the data transmission requires additional computing power. With incorporation into a lower level of data transmission, the transmission is repeated independently of the transmission log and independently of additional expenditure for the communicating computers. The inventive device can hence be operated independently of the computer systems connected to it. At the same time, it ensures a maximum of flexibility and reliability in transmission at a minimum additional load on the connected computers.

Another embodiment of the invention provides for the optional provision of means for clock regeneration in the coding means (7) or the decoder means (8), respectively. Moreover, clock regenerator means may be provided at an optional site along the data transmission path. On account of clock regeneration of a signal, the signal is synchronized with a clock pulse of constant frequency that is mostly obtained from the data stream by means of a PLL circuit. As a result, it is possible to improve the curve shape of the signal substantially. In this manner, the regenerated signal presents again clearly defined edges at reduced jittering and, as a consequence, with a wider eye opening.

In another embodiment of the invention, at least one filter is associated optionally with the transmitter (2) or the receiver (5), respectively. This filter serves for adaptation to the transmission characteristics of the data transmission path between the transmitter and the receiver. In this manner it is possible, particularly on the side of the receiver, to correct frequency-dependent amplitude and phase responses. Such filters may also serve to reduce external interference.

Another expedient embodiment of the invention resides in the aspect that the filter can be dynamically set. Specifically in the case of mobile units, the characteristics of transmission vary dynamically during the movement. These variations can be compensated by dynamic filter adjustment. Such a filter may be controlled, for example, by a micro controller or by a plain feedback control circuit.

In another expedient embodiment of the invention, at least one micro controller is provided for controlling or diagnosing the device. This micro controller comprises an optional memory for storing certain events such as errors or even the fact that threshold values have been exceeded. Such a micro controller expediently comprises a web server so that it can be operated by means of a conventional personal computer or an Internet terminal either locally or via the Internet. Additional, an optional display is provided for displaying certain operating states or operating parameters, respectively. For instance, errors in transmission, the signal-to-noise ratio, the bit error ratio or the fact that certain threshold values have been exceeded may be displayed. The entire control system can be optionally newly configured by software. In this manner it is possible, for instance, to re-load memory contents, data tables or even program codes in correspondence with the requirements.

According to another expedient embodiment, the device is of a self-learning or adaptive design. This means that it adapts itself dynamically, specifically during the movement, to the operating states. This can be achieved, for instance, by the detection of certain operating parameters such as the bit error ratio, the signal amplitude, etc. and by the subsequent adjustment of the coding means or decoder means or the filters, respectively. It is therefore particularly expedient to use here a fuzzy-logic controller. In this manner, the redundancy or the data rate, respectively, can be set as a function of the errors in transmission. This means that in the case of a high number of errors in transmission a higher redundancy is provided, for example. Specifically in the case of rotary movements, especially at a constant speed, it is advantageous to store the transmission function by the rotation and to set the coding means or the decoder means or the filters, respectively, in a corresponding manner as a function of the time or the position. This is, of course, equally possible in the case of linear movements if information relative to the position is available.

An inventive method of wideband transmitting digital signals by means of a device in correspondence with the introductory clause of Claim 1 provides for coding as well as optional decoding of the signals in order to improve the quality of transmission.

DESCRIPTION OF THE DRAWINGS

In the following, the invention will be described by exemplary embodiments, without any limitation of the inventive idea, with reference to the drawings.

FIG. 1 is a general schematic view of an inventive device.

FIG. 1 shows a schematic view of a particularly expedient embodiment of an inventive device. The data of a data source (1) is transmitted via a coding means (7) and a transmitter (2) to a transmitter conductor array (3). The transmitter conductor array is disposed along the path of the movement that is roughly indicated by the directional arrow (9) and passes on the signals fed by the transmitter. A receiving antenna (4) permits the interception of the signals of the near field of the transmitter conductor structure. The signals tapped by the antenna are passed on via a receiver (5) and via a decoder means (8) to the data sink (6).

LIST OF REFERENCE NUMERALS

1 data source
2 transmitter
3 transmitter conductor array
4 receiving antenna
5 receiver
6 data sink
7 coding means
8 decoder means
9 directional arrow indicating the direction of movement

The invention claimed is:

1. Device for wideband transmission of digital signals between at least one first unit and at least one second unit mobile along a predetermined path relative to said first unit, in particular via non-contacting rotary joints, said first unit comprising:
    a data source for generating a serial data stream;
    a transmitter for generating electrical signals from said serial data stream from said data source;
    a transmitter conductor array for transmitting said electrical signals;
    and said second unit comprising:
    a receiving antenna for tapping electrical signals in a near field of said transmitter conductor array;
    a receiver for receiving the electrical signals tapped by said receiving antenna;
    a data sink for subsequent processing of the electrical signals received by said receiver;
    wherein a coding means is provided between said data source and said transmitter, which performs a digital coding of said data stream in such a way that data is transmitted as said digital signals with a minimum of errors via said transmitter, said transmitter conductor array, said receiving antenna, and said receiver.

2. Device according to claim 1,
wherein a decoder means is provided between said receiver and said data sink.

3. Device according to claim 1,
wherein said coding means is designed for conversion of spectral characteristics of said data stream in such a way that power can be optionally increased or decreased within predetermined spectral ranges.

4. Device according to claim 1,
wherein a coding function of said coding means can be dynamically adjusted.

5. Device according to claim 1,
wherein said coding means is so designed that it contributes additional redundancy into said data stream.

6. Device according to claim 1,
wherein said coding means is so designed that it replaces data values at defined positions in said data stream.

7. Device according to claim 1,
wherein said coding means is so designed for increasing or reducing a data rate in said serial data stream.

8. Device according to claim 1,
wherein said coding means comprises a multiplexer for incorporating further data streams into the serial data stream of said data source.

9. Device according to claim 1,
wherein said coding means comprises means for enciphering the serial data stream of said data source.

10. Device according to claim 1,
wherein said coding means comprises means for storing data and for outputting data at different data rates to said transmitter in correspondence with actual transmission characteristics of a data transmission path between said transmitter and said receiver.

11. Device according to claim 2,
wherein said decoder means comprises additional means for signaling incorrectly transmitted data to said coding means via an additionally provided transmission channel, and that said coding means is designed for repeating a transmission of incorrectly received data packages upon request by said decoder means.

12. Device according to claim 2,
wherein said coding means or said decoder means optionally comprises means for clock regeneration.

13. Device according to claim 1,
wherein at least one filter is optionally assigned to said transmitter or said receiver for adaptation to transmission characteristics of a data transmission path between said transmitter and said receiver.

14. Device according to claim 13,
wherein said filter can be dynamically adjusted.

15. Device according to claim 1,
wherein a microcontroller is provided for controlling and diagnosing the device.

16. Device according to claim 1,
wherein the device is self-learning and dynamically adapts itself to respective conditions of operation.

17. Method of wideband transmission of digital signals between at least one first unit and at least one second unit mobile along a predetermined path relative to said first unit, in particular via non-contacting rotary joints, said first unit comprising:
  a data source for generating a serial data stream;
  a transmitter for generating electrical signals from said serial data stream from said data source;
  a transmitter conductor array for conducting said electrical signals generated by said transmitter;
  and said second unit movable in an arcuate path relative to the first unit, comprising:
  a receiving antenna for tapping electrical signals in a near field of said transmitter conductor array;
  a receiver for receiving the electrical signals tapped by said receiving antenna;
  a data sink for subsequent processing of the electrical signals received by said receiver;
  wherein a coding operation is performed on signals on a transmitter side, and a corresponding decoding operation is performed on signals on a receiver side, so that a transmission of the signals is improved.

* * * * *